United States Patent [19]

Graton et al.

[11] Patent Number: 5,014,842
[45] Date of Patent: May 14, 1991

[54] TORSION DAMPING DEVICE FOR AN AUTOMOTIVE FRICTION CLUTCH DISC

[75] Inventors: Michel Graton, Paris; André Dalbiez, Argenteuil, both of France

[73] Assignee: Valeo, Paris, France

[21] Appl. No.: 475,194

[22] Filed: Feb. 5, 1990

[30] Foreign Application Priority Data

Feb. 7, 1989 [FR] France ................. 89 01537

[51] Int. Cl.⁵ .................... F16D 3/14; F16D 3/66
[52] U.S. Cl. ................... 192/106.2; 464/68
[58] Field of Search .......... 192/106.2, 106.1, 70.17, 192/30 V; 464/66, 68

[56] References Cited

U.S. PATENT DOCUMENTS

| | | | |
|---|---|---|---|
| 4,212,380 | 7/1980 | Billet | 192/106.2 |
| 4,574,932 | 3/1986 | Despres | 192/106.2 |
| 4,596,535 | 6/1986 | Ooga | 464/68 |
| 4,634,398 | 1/1987 | Alas | 464/68 |
| 4,669,592 | 6/1987 | Alas et al. | 192/106.2 |
| 4,669,595 | 6/1987 | Fischer et al. | 192/106.2 |
| 4,698,045 | 10/1987 | Billet et al. | 464/68 |
| 4,813,523 | 3/1989 | Adachi | 192/106.2 |
| 4,860,871 | 8/1989 | Graton et al. | 192/106.1 |
| 4,899,862 | 2/1990 | Graton et al. | 192/106.2 |

FOREIGN PATENT DOCUMENTS

| | | |
|---|---|---|
| 3810922 | 10/1988 | Fed. Rep. of Germany . |
| 2494795 | 5/1982 | France . |
| 2524097 | 9/1983 | France . |
| 2560330 | 8/1985 | France . |
| 26112145 | 8/1988 | France . |
| 2614081 | 10/1988 | France . |
| 2205145 | 11/1988 | United Kingdom . |

*Primary Examiner*—Richard Lorence
*Attorney, Agent, or Firm*—Charles A. Brown

[57] ABSTRACT

The present invention is concerned with torsion damping devices of the kind comprising guide rings, a damper plate, a hub, and friction rings which form part of a first friction device and a second friction device, respectively. An abutment is provided for coupling together in a sub-assembly one of the friction rings and either the appropriate guide ring or the damper plate. In addition, axial retainers are provided between the two friction rings.

10 Claims, 3 Drawing Sheets

TORSION DAMPING DEVICE FOR AN AUTOMOTIVE FRICTION CLUTCH DISC

FIELD OF THE INVENTION

This invention is concerned with torsion damping devices, in particular for, but not restricted to, the clutch disc of a friction clutch for an automotive vehicle.

BACKGROUND OF THE INVENTION

A torsion damping device for an automotive friction clutch disc is described in U.S. Pat. No. 4,899,862, which teaches the use of an arrangement having two guide rings, a damper plate and a hub, all mounted coaxially with each other. A guide ring is arranged axially on each side of the damper plate, with respect to which they are able to move rotationally, within the limits of a predetermined range of angular displacement. This movement also takes place against the inhibiting action of a first friction means and first circumferentially acting resilient means, the latter typically being conventional clutch plate springs.

The hub is surrounded by the damper plate and the guide rings, and is arranged so that relative rotational movement can also take place between the hub and damper plate, again within the limits of a predetermined range of angular displacement, and against the action of a second friction means and second circumferentially acting resilient means. Each of the two friction means, first and second, includes a friction ring which is arranged axially between a common one of the guide rings and the damper plate, these friction rings being centered with respect to the axis of the assembly. The first friction ring, i.e. that of of the first friction means, surrounds the second friction ring which is the one forming part of the second friction means.

The assembly operation is carried out as a single station, with the components of the friction disc and its damper being offered up in succession in an axial direction. However, in certain cases, it can be desirable to reduce the number of components to be offered up axially so as to reduce the time spent in on-line assembly, and in particular to form sub-assemblies with a guide ring or the damper plate, this being done in a location which is away from the above mentioned station.

SUMMARY OF THE INVENTION

An object of the present invention is therefore to meet this requirement, by reducing the number of pieces to be introduced axially, while also obtaining other advantages.

In accordance with the invention, a torsion damping device of the general kind is described above is characterised in that axial retaining means are provided between the two said friction rings and either the damper plate or the appropriate guide ring, with axial retaining means being provided between the two said friction rings.

The invention enables one of the friction rings to be assembled with either the damper plate or the appropriate guide ring, using the other friction ring as the means connecting them, in such a way that it is possible to form a separate sub-assembly comprising the friction rings and either the damper plate or the guide ring concerned. This sub-assembly, which is loose, can be assembled in a different location on the production line from that in which final assembly takes place.

If desired, and as dictated by the application for which the damper is intended, resilient means for urging the friction components into frictional engagement with each other can be included in the sub-assembly. It is even possible to include in the sub-assembly at the same time both the damper plate and the guide ring, by providing, for example, a first abutment means between the damper plate and the end of the projecting fingers or lugs of a thrust ring such as the ring described in the above mentioned U.S. Pat. No. 4,860,871, together with further abutment means between the inner one of the friction rings and the guide ring. The two abutment means may comprise a plurality of fingers of one of the friction rings, extending through corresponding openings formed in the guide rings and connected to each other, after passing through the said guide ring, by means of a circlip engaged in a groove that is provided in the free end of the said fingers, the circlip being arranged to cooperate loosely with the guide ring.

Preferably the abutment means are of the snap-fit type. This snap-fit type abutment means preferably includes fingers that are resiliently deformable in the radial direction. Each of these fingers extends through an opening formed in the damper plate or in the guide ring, so as to become hooked against one of the faces of the damper plate or the said guide ring.

Preferably these fingers are integral with the friction ring, which in preferred embodiments is made of a synthetic material, the fingers also being associated with bosses formed on the friction rings for engaging the appropriate element so as to ensure that the friction rings rotate with the guide rings.

In a modification, resilient fingers similar to those mentioned above may also be provided between the friction ring concerned and either the damper plate or the guide rings, so as to integrate the former with the latter in a sub-assembly.

The axial retaining means may include a radial orientation shoulder, which is directed towards either the damper plate or the guide ring, as the case may be, and which is carried by one of the friction means, with the other friction ring having an abutment surface that is adapted to cooperate with the said shoulder.

The description which follows illustrates the invention, by way of example only and with reference to the accompanying drawings.

BRIEF DESCRIPTION OF THE DRAWINGS

FIG. 3 is a simplified view showing the loose coupling means provided between the damper plate and the hub.

FIG. 4 is a partial view in axial cross section, on a larger scale, showing first and second friction means which also appear in FIG. 1

FIG. 5 is a view of the same friction means themselves, with only their associated resilient means being shown, and is seen in the direction of the arrow 5 in FIG. 4.

DESCRIPTION OF PREFERRED EMBODIMENTS OF THE INVENTION

Figure 1:
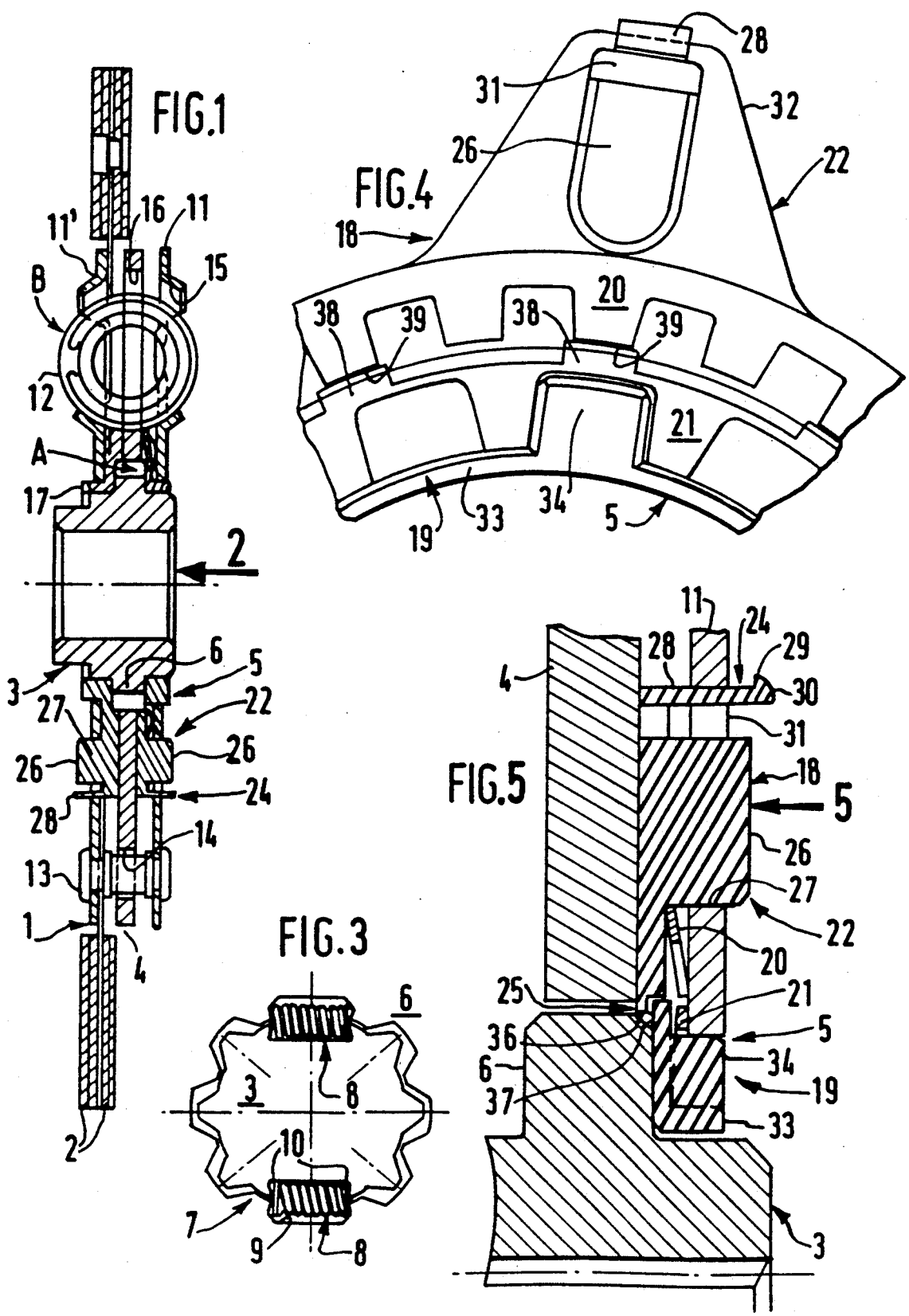
FIG. 1 is a view in axial cross section of a friction disc clutch according to the invention.

The drawings show a disc type friction clutch for an automotive vehicle, comprising a clutch disc or support 1, carrying friction pads 2, and a hub 3. The clutch disc 1 and the hub 3 are movable in rotation with respect to each other, and are coupled together through two torsion dampers with together give a "stepped" or damping effect. These comprise a pre-damper A and a main damper B, the pre-damper being weaker than the main damper.

Through the friction pads 2, the clutch disc 1 is arranged to be gripped between the pressure plate and the reaction plate (not shown) of the clutch, which are coupled with the crank-shaft of the engine of the vehicle for rotation with it, the clutch disc 1 being also arranged to be mounted by means of its hub 3 on the input shaft (not shown) of the gearbox so as to drive the latter.

The pre-damper A comprises a damper plate 4 which is mounted for rotational movement with respect to the hub 3 against the action of what will be called a second friction means 5, but within the limits of an angular displacement. In this example, and as shown in FIG. 3, the outer periphery of the hub 3 has a radial collar portion 6, which is axially aligned with the damper plate 4 and which lies within the latter.

A loose coupling means 7, of the kind described in U.S. Pat. No. 4,699,592, are formed partly on the inner periphery of the damper plate 4 and partly in the collar portion 6. This loose coupling means consists of a plurality of trapezoidal teeth and a plurality of complementary slots, with each tooth of the hub or the damper plate penetrating with a circumferential clearance into a corresponding one of the slots in the damper plate 4 or in the hub 3 respectively. Associated with the loose coupling means 7 are what will be referred to as a second resilient means 8, mounted between the collar portion 6 and the damper plate 4 so as to act circumferentially in order to damp out slow running impacts or noises. The resilient means 8 are of low stiffness, and in this example they consist of two coil springs diametrically opposed to each other and mounted in slots 9 formed in the damper plate 4 and in the hub 3, with thrust inserts 10 being interposed between the ends of the springs 8 and the edges of the slots 9. The thrust inserts 10 are of dihedral or shallow V-shaped cross section.

The main damper B comprises guide rings 11 and 11', which are mounted coaxially with the damper plate 4 and which are moveable in rotation with respect to the latter against the action of what will be referred to as first resilient means 12. The resilient means 12, which act circumferentially, consist of coil springs in this example, and are of greater stiffness than the springs 8. The rotational movement of the guide rings 11 and 11' with respect to the damper plate 4 is again limited within a predetermined range of angular displacement. The guide rings 11 and 11' are arranged axially on each respective side of the damper plate 4, and are coupled together at a fixed axial spacing by means of axial spacer elements 13, which also serve to secure the clutch disc or support 1 to the guide ring 11'. The damper plate 4 is provided with through openings 14 through which the spacer elements 13 extend, with a clearance around them.

The limitation of the relative angular displacement permitted between the damper plate 4 and the guide rings 11 and 11' can be obtained by cooperation of the spacer elements 13 with the edges of the through openings 14, or by the springs 12 becoming closed up. These springs 12 are mounted in windows 15 and 16, formed in the guide rings 11, 11' and in the damper plate 4, and arranged facing each other.

The guide rings 11, 11' freely surround the hub 3 without there being any loose coupling means between them, by contrast with the damper plate 4 which, as has been seen, surrounds the hub 3 but with the intervention of the loose coupling means 7.

An annular bearing 17, the cross section of which is generally in the form of an L, is interposed between the clutch disc 1, radially within and in line with the guide ring 11', and the damper plate 4, so that it constitutes a transversely extending spacing ring. This bearing 17 also lies radially between the inner periphery of the guide ring 11' and the outer periphery of the hub 3. It is coupled with the guide ring 11' for rotation with the latter, for which purpose the annular axial portion of the bearing is provided with bosses which are engaged in complementary recesses formed on the guide ring 11'.

Between the other guide ring 11 and the damper plate 4, friction rings 18, 19 and associated resilient means 20 and 21 are interposed. The resilient means 20 and 21 are in the form of tabbed Belleville rings in this example, their purpose being to assist the frictional action of the friction rings 18 and 19. Thus, the Belleville ring 20 bears on the guide ring 11, and biasses the friction ring 18 towards the damper plate 4, so that the bearing 17 is gripped between the clutch disc 1 and the guide ring 11' on the one hand and the damper plate 4 on the other. The Belleville ring 21 bears on the guide ring 11 and biasses the friction ring 19 towards the collar portion 6 of the hub, so that the bearing 17 is gripped between the guide ring 11' and the collar portion 6 (the clutch disc 1 extending radially outwards beyond the collar portion 6). In this way, the guide rings 11 and 11' are thus displaceable rotationally with respect to the damper plate 4, against the action of what will be called a first friction means 22, which comprises the friction ring 18, the Belleville ring 20 and the bearing 17. Similarly, the hub 3 is rotatable with respect to the damper plate 4 against the action of the second friction means 5 mentioned above, which consists of the friction ring 19, Belleville ring 21 and bearing 17. The two friction means 22 and 5 are coaxial with each other and are arranged so that the former lies radially outwards of the latter, with the rings 18 and 20 surrounding the rings 19 and 21.

In accordance with the invention abutment means 24 are provided between one of the friction rings 18, 19 and either the damper plate 4 or the appropriate guide ring 11 or 11', while axial retaining means 25 are provided between the two friction rings 18 and 19. In this example the abutment means 24 provide a snap fit. To this end, the friction ring 18, which is preferably made of a synthetic material, as are the friction ring 19 and the bearing 17, has a plurality of lugs in the form of axially projecting bosses 26, which are spaced regularly around a pitch circle of the ring 18.

Each of these bosses 26 extends through a cylindrical hole 27 formed in the guide ring 11, so that the latter is then coupled with the friction ring 18 for simultaneous rotation. Radially outwardly of each boss 26, the friction ring 18 has an associated finger 28, which is deformable resiliently in the radial direction. Each finger 28 is narrower radially than the corresponding boss 26, but is also longer in the axial direction than the latter. The transverse dimension of the wider portion of the boss 26 is smaller than that of the corresponding hole 27 in the guide ring, as will be described more fully below.

The free end of each finger 28 has a hook 29 with a rounded end 30 which facilitates its insertion through the hole 27, the hook 29 extending radially away from the axis of the assembly, so as to define a shoulder. As is shown in FIG. 5, each boss 26 has a generally oblong shape when viewed in the axial direction, but with two straight edges which are joined together through a rounded base portion, which constitutes the radially inner part of the boss, having a shape complementary to that of the corresponding hole 27.

Figure 2:
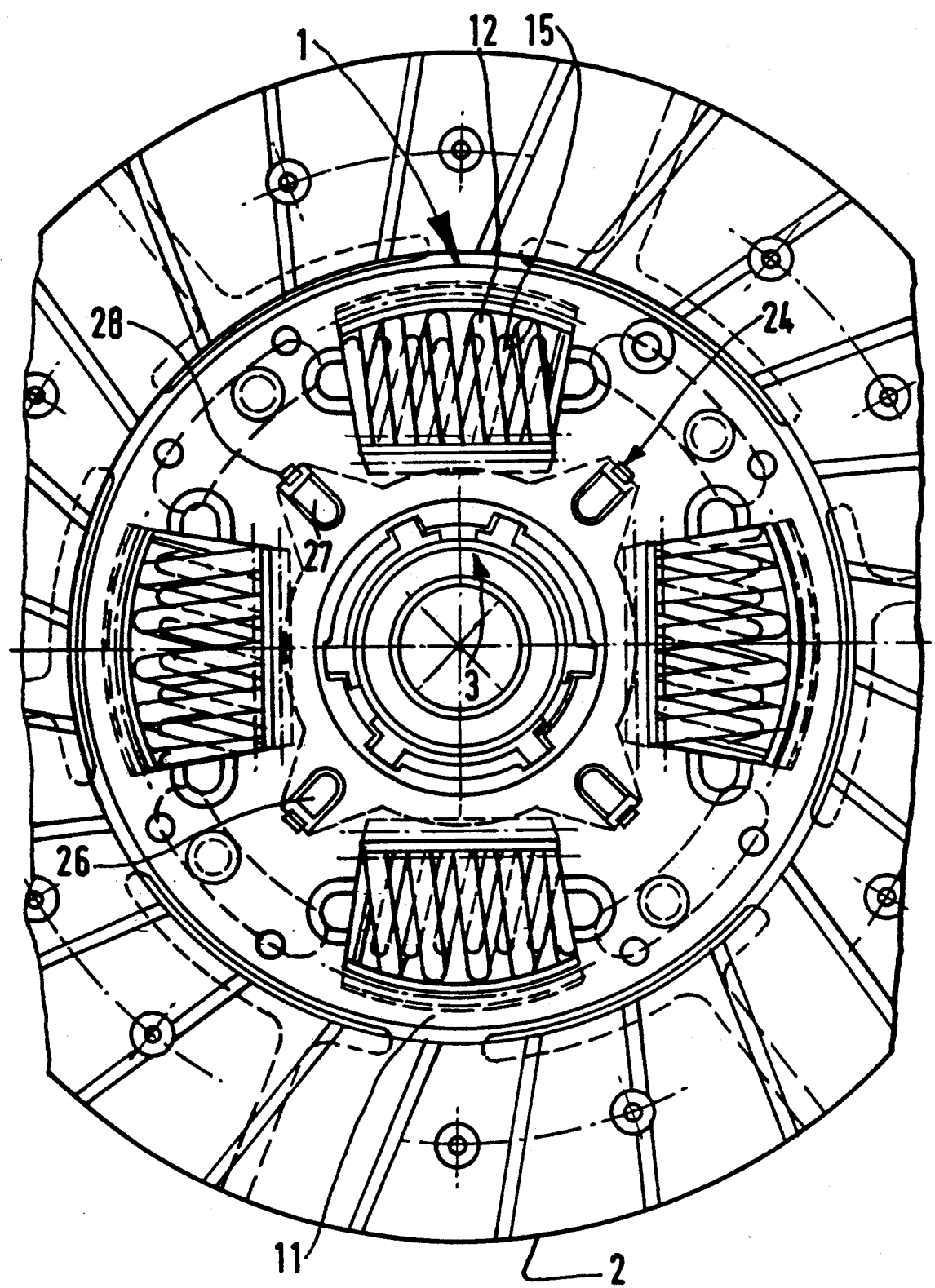
FIG. 2 is a view seen in the direction of the arrow 2 in FIG. 1.

Each finger 28 is adapted by means of its hook 29 to cooperate with the radially outer edge of the corresponding hole 27. This latter edge is straight, and is also wider than the finger when seen in the axial direction, so that no side contact is possible between the finger 28 and the side edges of the hole 27 (see FIG. 2).

A gap exists between each finger 28 and the radially outer edge of the associated boss 26. The friction ring 18 is provided with a plurality of radially projecting ears 32 at its outer periphery, with each boss 26 and its associated finger 28 being formed on a respective one of the ears 32. The gap 31 may be made closed at one end as in FIG. 1, or open at both ends as in FIG. 4, the latter arrangement giving the greater flexibility to the fingers 28. In this example, there are four ears 32 and four bosses 26, each with a finger 28 associated with it, and the gaps 31 are open in the region of the face of the corresponding ears 32 that face towards the damper plate 4.

It is of course possible to provide two laterally extending fingers, in association with each hole 27, with each of these fingers being adapted to cooperate with one of the side edges of the hole 27. However, this is in fact less advantageous than the arrangement of single radial fingers 28 shown, which allows the greatest possible amount of material to be preserved in the bosses 26 for better contact with the hole 27. In addition, with this arrangement there can be no interference with the diaphragm which is conventionally provided in a clutch.

The Belleville rings 20 and 21 are mounted so that their edges engaging the guide ring 11 are adjacent to each other, and they bear on the friction rings 18 and 19 while being centered, respectively, by the bosses 26 and by an axially extending annular flange 33 which is formed on the friction ring 19 at the inner periphery of the latter. This flange 33 is provided with further bosses 34, each of which cooperates with a complementary slot formed in the guide ring 11 so as to link the latter in rotation with the friction ring 19.

As will be clear from the foregoing, the Belleville rings 20 and 21 urge the various components into frictional engagement. As an alternative to Belleville rings, corrugated washers may be used.

Referring now to FIG. 4, the axial retaining means 25 comprise, in this example, a radial orientation shoulder 36 which is formed at the inner periphery of the friction ring 18. This shoulder 36 faces towards the guide ring 11 for cooperation with an abutment surface 37 of the friction ring 19, terminating at the outer periphery of the latter. The abutment surface 37 is of course formed on that face of the friction ring 19 which faces away from the guide ring 11. A shown, the retaining means 25 are divided, with the abutment surface 37 being formed on radial projections 38, FIG. 5, of the friction ring 19 and projecting radially from the outer periphery of the latter. Each projection 38 is engaged in a complementary slot 39 that is formed in the inner periphery of the friction ring 18. The slots 39 are filled by the shoulders 36 (FIG. 4).

The reverse arrangement is of course possible, in which the friction ring 18 has radially inwardly extending projections, each of which is engaged in a slot formed in the outer periphery of the friction ring 19. In this case, the retaining shoulders can be made in the form of projecting elements which extend the surface of the friction ring 18 that faces towards the damper plate 4, and which project radially and alternately with the above mentioned projections, being longer than the latter and axially offset from them. The abutment surface may be formed by closing the groove of the friction ring 19 at its end closest to the guide ring 11, to give a series of grooves in which the projections formed on the friction ring 18 are engaged. In another modification, the shoulder 36 may be made continuous, so as to join the projections 38 together but itself projecting with respect to the latter.

It will be understood from the foregoing that the friction ring 19 is coupled for simultaneous rotation, and pre-positioned, with respect to the friction ring 18 as a result of the arrangement described, the shape of the friction ring 19 being dictated by considerations of standardisation. The bosses 34 may well not exist as such.

It is thus possible to form a unitary sub-assembly consisting of the various rings 11, 19, 18, 20 and 21. To this end, the Belleville ring 21 is first fitted, followed by the friction ring 19, then the Belleville ring 20, and finally the friction ring 18, the fingers 28 of which flex radially towards the axis of the assembly due to the presence of the gap 31, so that they can then engage, by means of their hooks 29 and under the influence of the Belleville rings 20 and 21, on the opposite face of the guide ring 11. If reference is made to FIG. 4, it will be understood that before the damper plate 4 is assembled with the hub 3, the friction ring 19 is retained axially by the friction ring 18, with the latter coming into engagement with the abutment surface 37 by means of its shoulder 36.

After the spacers 13 have finally been assembled in place, the friction rings 18 and 19 are pressed together, and an axial clearance exists both between the friction ring 19 and the shoulder 36, and between the hook 29 and the guide ring 11. Clearances may of course also be provided in the abutment means 24 and in the axial retaining means 25, the position of the hooks 29 being such that the bosses 26 cannot escape from the holes 27, despite progressive wear of the friction ring 18 during use.

It will be appreciated that the guide rings 11 and 11' are identical with each other, so that the bearing 17 may also have bosses 26 and fingers 28 for engagement in the holes 27 formed in the guide ring 11'. This arrangement makes it possible to form a sub-assembly consisting of the guide ring 11' and clutch disc 1, with the spacer bars 13 being mounted in position during final assembly.

It will be recalled that, when the clutch disc 1 is displaced in rotation with respect to the hub 3, the springs 8 are compressed first; the guide rings 11 and 11' form a block with the damper plate 4, so long as the forces involved are enough to compress the springs 8 but not enough to compress the springs 12. This situation persists until the clearance in the loose coupling means 7 is taken up. Then, in the second stage, the guide rings 11 and 11' are displaced in rotation with respect to the damper plate 4, against the action of the springs 12. Thus the friction ring 19 acts in the first stage, but the other friction ring 18 comes into operation only after the damper plate 4 has been made rotatable with the hub 3.

The present invention is of course not limited to the embodiments described. In particular, the axial retaining means 25 may consist of complementary conical surfaces formed on the friction rings 18 and 19 respectivley at their inner periphery and at their outer periphery. As has been mentioned above in connection with an arrangement described in the French published patent application No. FR 2 611 245A, the shoulder 36 may be formed on the friction ring 19, as may the abutment means 24, while the friction ring 18 passes through the damper plate 4. Abutment means are then provided between the end of the said projections and the face of the damper plate which faces away from the friction ring 18. Such an abutment means may consist of resiliently deformable fingers, having hooks, similar to the fingers 28. The hooks 29 are then directed towards the axis of the assembly. In this case, the abutment means corresponding to the abutment means 24 can be provided at the level of the friciton ring 19 (as indeed they may as a modification to the embodiments shown in the Figures described above), the fingers 28 then being associated with the bosses 34.

The fingers 28 may be quite separate from association with corresponding bosses 26, in which case additional holes would then be provided as appropriate in the guide rings 11 and 11'.

Figure 6:
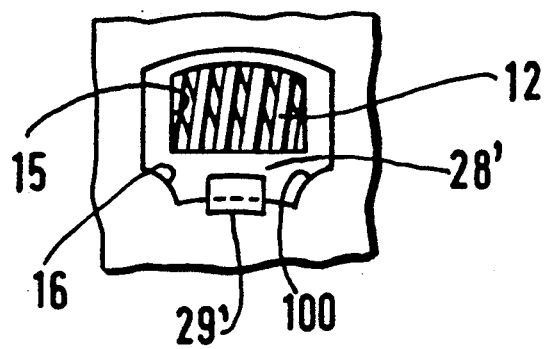
FIG. 6 is a partial view of one of several windows, formed in the damper plate and intersected by a supplementary finger according to the invention.

Reference is now made to FIG. 6, in which supplementary fingers 28', directed axially in the opposite direction from the fingers 28, extend through the damper plate 4, for example through the windows 16 in the latter, which are shaped accordingly, the fingers 28 extending from the guide ring 11. Thus the window 16 is here formed with a slot 100 to allow the finger 28' to pass through it with a circumferential clearance, the hook 29' of the finger being directed towards the axis of the assembly. The whole forms a supplementary abutment means. Due to the supplementary fingers 28', the damper plate 4 can be snap fitted on to the sub-assembly consisting of the guide ring 11 and friction means 22 and 5.

Figure 7:
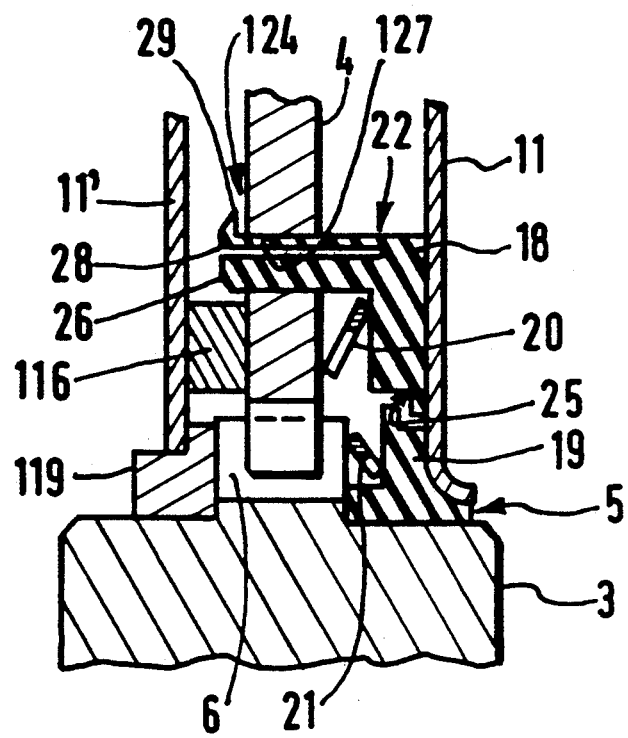
FIG. 7 is a partial view similar to FIG. 1, but shows another embodiment.

Referring now to FIG. 7, a sub-assembly, consisting of the damper plate 4 and friction means 22 and 5, is made by inversion of the orientations of the friction rings 18 and 19. In FIG. 7, the friction ring 18 extends through the holes 127 of the damper plate, with the abutment means 124 acting between the damper plate 4 and the friction ring 18 with its fingers 28 and bosses 26. The Belleville ring 20 bears on the damper plate and biasses the friction ring 18 into contact with the guide ring 11. Similarly, the Belleville ring 21 bears on the collar portion 6 of the hub, and biasses the friction ring 19 into contact with the guide ring 11.

It will be noted that, since the Belleville ring 21 is continuous, the latter cannot escape from the sub-assembly of the components 4, 22 and 5, since the teeth of the damper plate 4 which form part of the loose coupling means 7 (see FIG. 3) retain the ring 21 in position. It will also be noted that the retaining shoulder of the friction ring 18 is here directed towards the damper plate 4. The friction ring 18 can be provided with supplementary fingers, similar to the fingers 28, for hooking engagement on the guide ring 11.

It is pointed out that the reference 119 represents a bearing, and the reference 116 a spacer ring.

The low stiffness resilient means 8 can of course be part of a pre-damper, with guide rings and damper plate, that is disposed axially between the damper plate 4 and one of the guide rings 11, 11' in the manner described in the above mentioned French published patent application No. FR 211 245A and in U.S. Pat. No. 4,883,156.

The invention is applicable to a torsion damper for use in applications from which the clutch disc 1 is absent, in which case for example, one of the guide rings 11 or 11' can be directly fixed on a flywheel which is secured to the engine crankshaft, the hub being coupled to the input shaft of the gearbox.

The damper plate 4 may be split, in the manner described in U.S. Pat. No. 4,698,045.

Finally, the resilient means 8 and 12 may be in the form of resilient blocks, made for example of rubber.

What is claimed is:

1. A torsion damping device defining an axis and comprising:
   a hub;
   at least one damper plate;
   means mounting the damper plate or plates coaxially around the hub and defining a range of relative angular displacement between the hub and the damper plated;
   two guide rings coaxially surrounding the hub and one of said guide rings being disposed axially on each side of said at least one damper plate;
   first friction damping means comprising a first friction ring;
   second friction damping means comprising a second friction ring, said friction rings being both disposed axially between one of the guide rings and said damper plate;
   means centring the friction rings coaxially with the said axis, with the said first friction ring surrounding the said second friction ring;
   coupling means coupling at least one of said friction rigns with one of said guide rings or said damper plate for rotation therewith;
   first circumferentially acting resilient means coupling said guide rings with said at least one damper plate, whereby the guide rings are moveable rotatably with respect to the latter against the action of said first friction mesan and first resilient means within the limits of an angular displacement; and
   second circumferentially acting resilient means coupling the hub with said damper plate or plates, whereby the latter is moveable rotatably about the hub within the limits of the range of relative angular displacement, against the action of said second friction means and second resilient means,
   wherein the device further comprises abutment means between a sub-assembly comprising one of said friction rings and an element selected from the group consisting of said at least one damper plate and the guide ring associated with said one friction ring for coupling together said sub-assembly, and axial retaining means between the two friction rings for retaining the two friction rings together in rotation.

2. A torsion damping device according to claim 1, wherein the abutment means comprise snap fitting means.

3. A torsion damping device according to claim 2, wherein said friction ring has projecting first fingers which are resiliently deformable in a radial direction and which are provided with hooks, an element of said group having a through hole corresponding to each of said first fingers, each of said fingers extending through one of said holes and being adapted to engage on said element by means of its respective hook after a clearance has been taken up, thereby constituting said abutment means.

4. A torsion damping device according to claim 3, wherein said fingers are integral with the friction ring of the first of said friction means, the friction ring of the first of said friction means further having bosses for engaging in said holes formed in the associated element of said group for coupling said element with the friction ring having said bosses.

5. A torsion damping device according to claim 4, wherein said fingers are longer but narrower than said bosses.

6. A torsion damping device according to claim 1, wherein one of said friction rings has a radial orientation shoulder facing towards the associated element of said group, the other friction ring having an abutment surface which is adapted to cooperate with said shoulder, thereby constituting said axial retaining means.

7. A torsion damping device according to claim 6, wherein the second friction ring has second bosses, said abutment surface being formed on said second bosses, the first friction ring having slots complementary to said second bosses and engaging therewith.

8. A torsion damping device according to claim 6, wherein said slots in the second friction ring are closed by said shoulder.

9. A torsion damping device according to claim 1, wherein supplementary second abutment means are provided between one of said friction ring and the element of said group not engaged by the first abutment means.

10. A torsion damping device according to claim 9, wherein said first friciton ring includes supplementary fingers, which are resiliently deformable in a radial direction and which are provided with hooks, the supplementary fingers being directed in the opposite axial direction from said first fingers so as to engage the associated said element by means of their hooks after a clearance has been taken up, each supplementary finger extending through a hole in said element, said supplementary fingers and said element constituting the second abutment means.

* * * * *